Jan. 2, 1951 K. E. LYMAN 2,536,819
FRONT WHEEL SPINDLE AND BEARING ASSEMBLY
Filed March 10, 1947
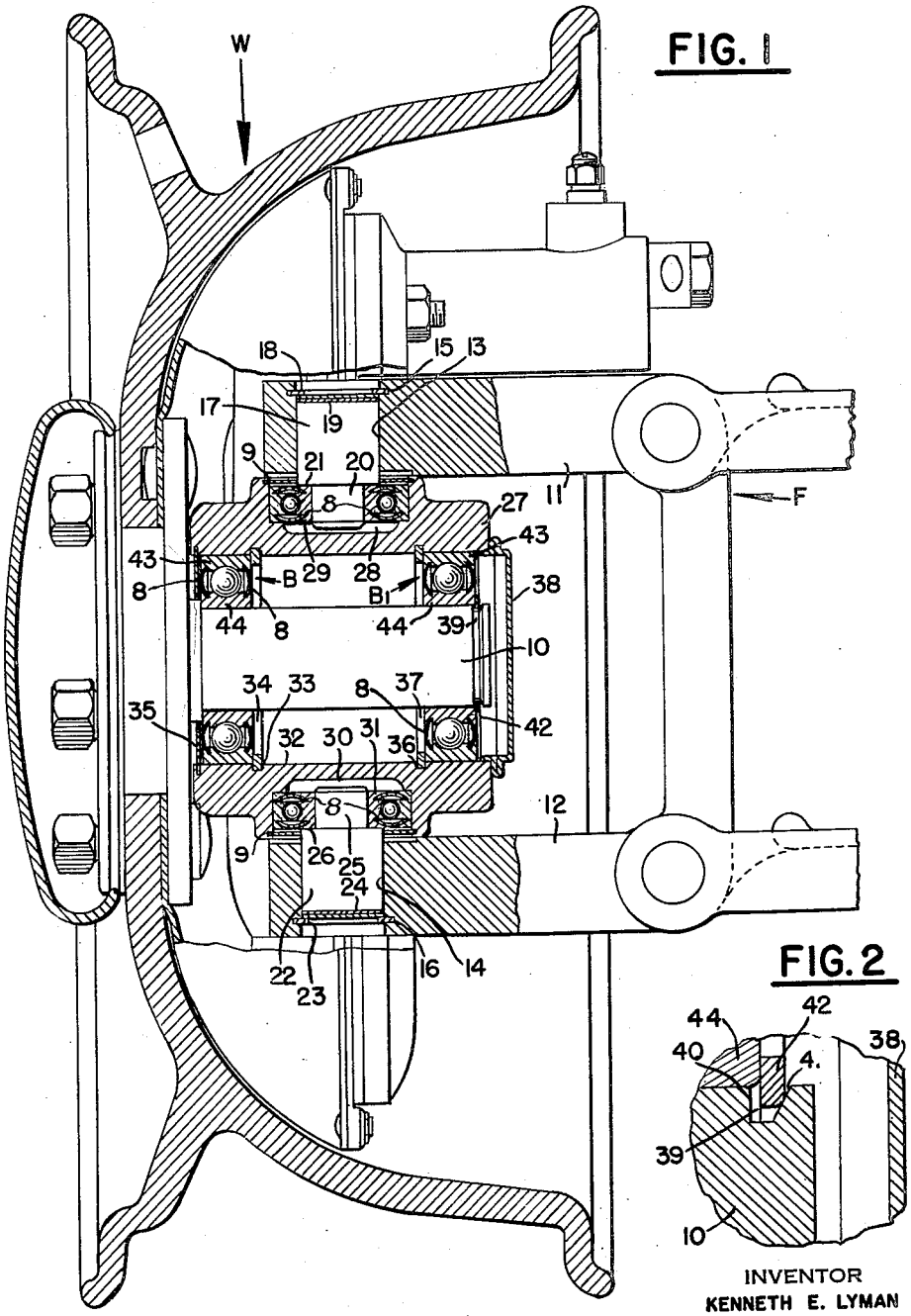
INVENTOR
KENNETH E. LYMAN
BY
Toulmin & Toulmin
ATTORNEYS Patented Jan. 2, 1951

2,536,819

UNITED STATES PATENT OFFICE 2,536,819

FRONT WHEEL SPINDLE AND BEARING ASSEMBLY

Kenneth E. Lyman, Lake Forest, Ill., assignor to Tucker Corporation, Chicago, Ill., a corporation of Delaware Application March 10, 1947, Serial No. 733,631

2 Claims. (Cl. 308—236)

The present invention relates to the mounting of the front wheel of an automobile and is concerned primarily with the spindle and bearing assembly on which the wheel is mounted.

At the present time the servicing of an automobile requires from time to time the lubrication of the bearings in which the wheels are journaled. The present invention is predicated largely on the belief that the owner of a car will find it more satisfactory if a bearing assembly is provided which will be permanently lubricated at the time of assembly and remain in this condition during the life of the car.

Accordingly, this invention has as its primal objective the provision, in an automobile including a wheel, of a bearing and wheel mounting assembly which includes race assemblies with a lubricant therefor that is permanently incorporated into the bearings at the factory.

More in detail the invention has as an object the provision of a bearing assembly of the character indicated which includes a bearing block formed with a cylindrical bore, race assemblies within said bore, and a wheel carrying axle rotatably supported by said races within said bore in spaced relation thereto. The lubricant is contained in each race assembly.

To the end of lending permanency to this assembly one element of each bearing race is more or less permanently secured to the block while the complemental element is affixed in a similar manner to the axle. These bearing elements are not susceptible of removal from parts to which they are attached at the ordinary garage or service station but must be returned to the factory as a unit if any repairs are to be made thereto.

It is highly important that the axle at all times be held within the bearing block. Accordingly, a further object lies in the provision of a means for maintaining this relation. In attaining this end the inner free end of the axle is formed with a groove with an inclined wall adapted to function as a cam. A spring retaining ring is snapped into this groove and has a tendency to contract. The projecting part of this ring engages a bearing race while the inner part engages the inclined wall. Thus, there is a constant tendency to draw the axle into the bore of the bearing block.

Still another object of the invention is to provide a new and improved spindle for rotatably mounting the bearing block on the framework of a car on a substantially vertical axis so as to accommodate the steering operation. In achieving this object the bearing block is provided with upper and lower wells on substantially horizontal planes. Received in each well is a bearing race assembly that in turn receives a stud carried by the framework.

Various other more detailed objects and advantages of the invention, such as arise in connection with carrying out the above noted ideas in a practical embodiment, will in part become apparent and in part be hereinafter stated as the description of the invention proceeds.

The invention, therefore, comprises a front wheel spindle and bearing assembly consisting of a bearing block having a bore which is rotatably mounted on a vertical axis by a novel spindle arrangement together with bearing race assemblies which rotatably support a wheel carrying axle within said bore. Each race assembly is permanently lubricated and the race elements are securely affixed to the block and axle respectively.

For a full and more complete understanding of the invention, reference may be had to the following description and accompanying drawings wherein:

Figure 1 is a vertical section through a front wheel of a motor vehicle which is mounted on a spindle and bearing assembly designed in accordance with the precepts of this invention; and Figure 2 is an enlarged detailed sectional view showing of the spring retainer and axle with which it cooperates.

Referring now to the drawing wherein like reference characters denote corresponding parts and first more particularly to Figure 1, a wheel and associated parts are identified in their entirety by the reference character W. As illustrated in the drawing, the wheel W is intended to be the front wheel of a motor vehicle. It is drivably mounted on an axle 10.

That portion of the framework of a car with which this invention is concerned is referred to generally as F. This framework F includes an upper horizontally extending member 11 and a corresponding lower member 12. These members project outwardly of the framework F and adjacent to their free ends are formed with vertical openings 13 and 14 which are substantially of the same dimensions and in alignment. The opening 13 is formed with an annular groove 15 and the opening 14 is provided with a similar annular groove 16. The purpose of these grooves will be later pointed out.

A trunnion 17 is positioned in the opening 13 and held in this position by a snap retaining ring 18 which is seated in the groove 15. Shims 19 may be interposed between the upper end of the trunnion 17 and the retaining ring 18 to assure proper positioning of the trunnion 17. The lower end of the trunnion 17 is reduced to provide a stud 20 which is spaced from the trunnion 17 by a shoulder 21.

Likewise, a trunnion 22 is positioned in the opening 14 and held therein by a snap ring 23 that is seated in the groove 16. Shims 24 may be interposed between the trunnion 22 and ring 23 when the trunnion 22 carries an upward extending stud 25 and is defined by a shoulder 26.

A bearing block 27 is positioned within the framework F between the members 11 and 12. The block 27 is formed with an upper well 28 in which is positioned a bearing assembly 29. The stud 20 carries the inner race element of this assembly 29 while the block 27 carries the outer race. In this position the shoulder 21 abuts the bearing race assembly 29. A dust guard 9 is positioned around the trunnion 17 above the bearing race assembly 29. It will be noted that the space between the race elements of the assembly 29 is closed by sealing rings 8 and a suitable lubricant is permanently contained between these sealing rings within the race elements.

In a similar manner the block 27 is formed with a lower well 30 in which is positioned a bearing race assembly 31. The stud 25 extends upwardly into this race assembly 31 and carries an inner race element thereof. The bearing race assembly 31 rests on the shoulder 26 and another dust guard similar to the dust guard 9 may be positioned around the trunnion 22 and under the bearing race assembly 31. The lubricant for the race assembly 31 is also sealed in by rings 8 as above described.

It is evident that the trunnions 17 and 22 with the studs 20 and 25 serve to pivotally mount the bearing block 27 on a vertical axis.

The block 27 is formed with a cylindrical bore 32 into which extends the axle 10. A bearing race assembly identified in its entirety by the reference character B is interposed between the axle 10 and bore 32 at one end and a similar bearing assembly $B_1$ assumes a similar position at the inner end. The bore 32 is formed with an annular groove 33 which receives an expansion snap ring 34 that serves to position the bearing assembly B. Adjacent its outer end the bore may also be formed with another annular groove which receives a dust guard 35.

The bore 32 is formed with another annular groove 36 in which is seated an expansion snap ring 37 that limits the inner movement of the bearing assembly $B_1$. The inner end of the bore 32 is closed by a cover plate 38. The inner end of the axle 10 is formed with a groove designated 39. Upon referring to Figure 2 it will be noted that the groove 39 is defined by a wall 40 that it normal to the axis of the axle and a wall 41 which is inclined with respect to the axis. A spring retaining ring 42 having a normal tendency to contract is snapped into the groove 39. That portion of the ring 42 which projects beyond the outer cylindrical surface of the axle 10 engages the bearing assembly $B_1$ while that portion which extends into the groove engages the inclined wall 41. The latter functions as a cam so that the effect of the spring ring 42 is to constantly exert a tendency tending to draw the axle 10 into the bore 32 of the block 27.

Each of the bearing assemblies B and $B_1$ includes an outer race element 43 which is tightly positioned in the bore 32 of the block 27. This relation may be obtained by freezing the race 43 prior to insertion into the bore 32 so as to cause its contraction due to the lowered temperature. It is inserted in its frozen condition and as it loses its condition it warms up and expands into the tight fit required. Each of the bearing assemblies B and $B_1$ also includes an inner race element 44 which is firmly affixed to the axle 10. This relation may be accomplished in substantially the same manner; that is, freezing the axle 10 before it is placed within the elements 44. Subsequent expansion will attain the tight fit required.

Each of the bearing assemblies B and $B_1$ is permanently lubricated by the application of a proper lubricant between the race elements and which lubricant is held therein by sealing rings 8 that have their edges fitted in confronting grooves of the respective race elements. If a bearing assembly should become disordered, it may be removed as a unit, replaced by another new unit, and returned to the factory for servicing.

While preferred specific embodiments of the invention are hereinbefore set forth, it is to be clearly understood that the invention is not to be limited to the exact construction and steps illustrated and described because various modifications of these details may be provided in putting the invention into practice within the purview of the appended claims.

What is claimed is:

1. In a bearing assembly of the character described, a bearing block having a cylindrical bore formed with annular grooves spaced from the ends thereof, a wheel carrying axle extending into said bore in spaced relation with respect thereto, a bearing race assembly at one end of said bore between said axle and block, an expansion spring ring received in one of said grooves and engaging said bearing race assembly to position the same, a second bearing race assembly at the other end of said bore between said axle and block, and an expansion spring ring received in the other of said grooves and engaging said last mentioned bearing race assembly to position the same, each of said bearing race assemblies including an outer race element positively secured to said block and an inner race element positively secured to said axle.

2. In a bearing assembly of the character described, a bearing block having a cylindrical bore formed with annular grooves spaced from the ends thereof, a wheel carrying axle extending into said bore in spaced relation with respect thereto, a bearing race assembly at one end of said bore between said axle and block, an expansion spring ring received in one of said grooves and engaging said bearing race assembly to position the same, a second bearing race assembly at the other end of said bore between said axle and block, an expansion spring ring receiving in the other of said grooves and engaging said last mentioned bearing race assembly to position the same, each of said bearing race assemblies including an outer race element positively secured to said block and an inner race element positively securely to said axle, the free end of said axle being formed with an annular groove having an inclined wall, and a contraction spring ring seated in said groove and engaging said inclined wall and one of said bearing race assemblies whereby it exerts a tendency normally drawing said axle into said bore.

KENNETH E. LYMAN.

REFERENCES CITED

The following references are of record in the file of this patent:

UNITED STATES PATENTS

| Number | Name | Date |
|---|---|---|
| 1,418,379 | Karle | June 6, 1922 |
| 1,978,186 | Buchanan | Oct. 23, 1934 |
| 2,052,524 | Baker | Aug. 25, 1936 |
| 2,056,946 | Ankeny | Oct. 13, 1936 |
| 2,206,216 | Ash | July 2, 1940 |
| 2,206,323 | Hughes | July 2, 1940 |
| 2,259,813 | Garnett | Oct. 21, 1941 |
| 2,317,906 | Garnett | Apr. 27, 1943 |

FOREIGN PATENTS

| Number | Country | Date |
|---|---|---|
| 498,750 | Germany | May 27, 1930 |